(12) United States Patent
Perry et al.

(10) Patent No.: US 6,386,480 B1
(45) Date of Patent: May 14, 2002

(54) AUTONOMOUS STRATOSPHERIC AIRSHIP

(75) Inventors: William D. Perry; Thomas H. Jaeckle; Lawrence E. Epley; Allan B. Black, all of San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 09/247,878

(22) Filed: Feb. 15, 1999

Related U.S. Application Data

(60) Provisional application No. 60/111,835, filed on Dec. 11, 1988.

(51) Int. Cl.[7] .............................. B64B 29/00; B64B 1/40
(52) U.S. Cl. ............................................ 244/24; 244/31
(58) Field of Search ................................ 244/24, 30, 31

(56) References Cited

U.S. PATENT DOCUMENTS

| | | | |
|---|---|---|---|
| 2,929,581 A | 3/1960 | Johnson | 244/30 |
| 4,179,612 A | 12/1979 | Smith | 250/203 R |
| 4,204,656 A | 5/1980 | Seward, III | 244/30 |
| 4,262,864 A | * 4/1981 | Eshoo | 244/31 |
| 4,318,522 A | 3/1982 | Appleberry | 248/178 |
| 4,328,417 A | 5/1982 | Himes | 250/203 R |
| 4,364,532 A | 12/1982 | Stark | 244/30 |
| 4,534,525 A | * 8/1985 | Bliamptis | 244/30 |
| 4,934,631 A | 6/1990 | Birbas | 244/30 |
| 4,995,572 A | 2/1991 | Piasecki | 244/2 |
| 5,074,489 A | 12/1991 | Gamzon | 244/2 |
| 5,333,817 A | 8/1994 | Kalisz et al. | 244/97 |
| 5,346,162 A | 9/1994 | Belie et al. | 244/137 |
| 5,348,254 A | 9/1994 | Nakada | 244/97 |
| 5,518,205 A | 5/1996 | Wurst et al. | 244/58 |
| 5,538,203 A | 7/1996 | Mellady | 244/97 |
| 6,010,093 A | * 1/2000 | Paulsen | 224/24 |

FOREIGN PATENT DOCUMENTS

| | | | |
|---|---|---|---|
| FR | 2 954 791 | 2/1986 | B64B/1/24 |
| JP | 54-35994 | 3/1979 | |
| JP | 5-221387 A | 8/1993 | B64B/1/14 |
| WO | WO88/00555 | 1/1988 | |

* cited by examiner

Primary Examiner—Charles T. Jordan
Assistant Examiner—Judith A. Nelson
(74) Attorney, Agent, or Firm—Oliff & Berridge, PLC

(57) ABSTRACT

An autonomous stratospheric airship comprising a hull which contains an equipment bay, forward and aft ballonets, forward and aft air management sub-systems, a propulsion system, and a control system is described. The airship also comprises a regenerative solar energy power and storage sub-system which allows powered daytime and nighttime operations. Further, the control system of the airship enables autonomous operation between selected waypoints or along a specified line of sight. The solar arrays utilized by the airship are internally mounted within the bull and gimballed so as to provide maximum collection efficiency and not impede the aerodynamic profile of the airship. A greatly simplified and slightly less controllable version of the airship, which makes use of alternative solar array control and ballast management systems, while carrying the equipment bay on the exterior of the hull, is also disclosed.

10 Claims, 13 Drawing Sheets

AUTONOMOUS STRATOSPHERIC AIRSHIP

This application claims the benefit of U.S. Provisional Patent Application Ser. No. 60/111,835, filed on Dec. 11, 1998.

GOVERNMENT LICENSE RIGHTS

The U.S. Government has a paid-up license in this invention and the right in certain circumstances to require the patent owner to license others on reasonable terms as provided for by the terms of Contract No. F41621-93-05006 T.O. 0026 for the Joint Command and Control Warfare Center.

BACKGROUND OF THE INVENTION

1. Field of the Invention

The present invention relates to the field of lighter-than-air type craft and, more particularly, to an autonomous stratospheric airship having a neutrally buoyant structure at flight altitude, making use of regenerative electric energy storage and collection.

2. Description of the Related Art

In the past, there have been designed and used a series of dirigibles, other types of lighter-than-air vehicles, hot-air balloons, and so forth, for passenger transport, rescue work, lift capabilities, and transport of goods and supplies. The present invention relates to a powered airship having a buoyant structure designed specifically for operations in the stratosphere. It incorporates an autonomous navigation capability and a regenerative solar electric energy collection and storage system, enabling the airship to remain aloft for extended periods of time, while following a specified course and gathering mission-specific data.

The prior art reveals several attempts at providing a portion of the capabilities embodied in the present invention, but none was found to incorporate all of the capabilities mentioned below and each such attempt tends to utilize rather complicated mechanical structures. U.S. Pat. Nos. 5,333,817 and 5,538,203 both disclose a buoyancy adjustment system for a lighter-than-air vehicle, involving a series of ballonets, each arranged along the longitudinal axis of the airship in equal numbers. The object of these inventions is to provide a system of independent control for ballonet inflation/deflation which dispenses with ducted coupling to the individual ballonets. In addition, U.S. Pat. No. 5,538,203 provides rapid deflation of the same ballonet system, instead of merely venting it to the atmosphere. In either case, this system is rather primitive and does not take into account the differential pressure between the atmosphere, the surrounding airship gas bag, and the pressure within individual ballonets.

U.S. Pat. No. 5,348,254, issued to Nakada, claims an airship design for flights of long duration powered by solar cell batteries and a hydrogen generation system. This system obviates the need for batteries by electrolytic generation of hydrogen; however, accidental puncture of the hydrogen storage envelope can easily result in complete destruction of the airship.

U.S. Pat. No. 4,995,572, issued to Piasecki, describes a multi-stage, high-altitude data acquisition platform comprising the combination of a low-altitude dirigible and a stratospheric balloon for use at 60,000 ft. and above. The primary object of this invention is to provide a stable launch platform for lifting heavy payloads to stratospheric altitudes. The airship contains a silo used to retain the stratospheric balloon for launch from low altitudes. Such a multi-vehicle payload lifting system is rather complex and unnecessary for accomplishing the advantages and objectives of the present invention.

U.S. Pat. No. 4,204,656 issued to Seward III, discloses a bi-axial propulsing control system for airships. This system, as illustrated in the patent drawings, does not distribute the propulsion motor loading equally among the ascent/descent and left/right movement axes. In addition, the torquing forces of the propulsion motor are applied at the ends of the orientation axes, causing greatly increased loading on the propulsion direction drive system.

French Patent No. 86 02734 discloses a dual-axis, symmetric propulsion system for airships. This system comprises a set of two or more motors which move in concert to direct the motion of the airship. This application requires a plurality of motors, unnecessary to implementation of the present invention.

U.S. Pat. No. 4,934,631, issued to Birbas, describes a lighter-than-air vehicle comprising a framework surrounded by a series of inflatable lift bags. Each bag contains a heating element and lifting gas. The propulsion system comprises a shrouded propeller with vanes to direct the propulsive force. While this airship makes use of a single propulsion unit to navigate through the air, it entails a complicated assembly structure which is impractical for inexpensive construction. In addition, the airship has no means of autonomous navigation or maintaining station above a fixed point of the surface of the earth in autonomous fashion.

Japanese Patent No. 5-221387A discloses an airship constructed of transparent materials wherein a solar array is disposed to receive energy from the sun. However, this design is not constructed for multiple-axis array adjustment to capture the maximum amount of solar energy based on the airship position in relation to the sun. Only a single, longitudinal, axis of rotation for the array is shown. Other patents, such as Japanese Patent No. 54-35994, U.S. Pat. No. 5,518,205 issued to Wurst et al., and U.S. Pat. No. 4,364,532 issued to Stark, all describe solar-powered airships with solar cells disposed on the surface structure of the ship. Again, the inherent disposition of the cell structure precludes the use of optimal positioning of the cells to capture the maximum amount of solar energy to be gained given a varied position of the airship in relation to the sun.

None of the aforementioned inventions are directed toward an autonomous platform specifically designed for flight in the lower stratosphere. In addition, none are directed toward an airship which is capable of controlling operational altitude, including maintenance of a fixed position over a point on the surface of the earth, or navigation between predetermined waypoints. Further, none of the prior art is directed toward an autonomous airship having a specially constructed solar array energy extraction source which provides sufficient energy for power during the day, and stores sufficient energy for continuous night-time operation.

Therefore, it is desirable to have an autonomous airship specifically designed for flight in the lower stratosphere, with the ability to maintain a fixed position over a point on the surface of the earth, or navigate between predetermined waypoints. Additionally, it is desirable to have an autonomous airship capable of controlling its operational altitude, using ballonets to control the pitch axis attitude. Furthermore, it is desirable to have an autonomous airship which uses a single motor for propulsion that evenly distributes the propulsive forces along the directive axes of the articulating means. It is also desirable to have an autonomous airship which can utilize solar energy to power propulsion during the day and additionally, store sufficient energy for continuous operation throughout the night.

SUMMARY OF THE INVENTION

In accordance with one aspect of the present invention, an autonomous airship designed specifically for flight in the lower stratosphere with the capability for maintaining a fixed position over a point on the surface of the earth is disclosed. Additionally, the airship provides autonomous control and navigation between predetermined waypoints, or may be programmed to remain within the optical line of sight of a predetermined position on the surface of the earth by matching the speed of the wind.

Other features of the airship embodying the present invention include construction from high strength, lightweight, polymer-based film materials for strength, and transparent/translucent material for collection of solar energy by internally-mounted solar arrays. The autonomous airship can be launched in an uninflated condition and does not require control or propulsion during ascent. The internally mounted arrays reduce aerodynamic drag, provide a pointing capability for maximum solar energy collection, are cooled by an air duct, and are contained within a separate chamber which permits access to the arrays from the outside of the airship.

The airship embodying the present invention may include a hull defining an enclosed cavity, a lifting gas, a forward ballonet, an aft ballonet, and an equipment bay disposed within the cavity, the bay defining an enclosed chamber, and an overall air management subsystem, at least one solar array, a multiplicity of energy storage units, and an autonomous control system disposed within the bay, the chamber being in fluid communication with the forward and aft ballonets; a propulsion system attached to the hull and in electrical communication with at least one solar array and the energy storage units; and a multiplicity of tail fins attached to the hull. The air management subsystem may further comprise a forward air management subsystem having a blower and an aft air management subsystem, the forward air management subsystem being in fluid communication with the forward ballonet and the bay, and the aft air management subsystem being in fluid communication with the aft ballonet and the bay. The forward air management subsystem may comprise a forward ballonet pressure sensor and the aft air management subsystem may comprise an aft ballonet pressure sensor. The forward and aft air management subsystems may also each comprise a lifting gas release valve, the valves being in fluid communication with the hull.

The propulsion system of the present invention may further comprise a gimbal housing, a motor and transmission assembly, a motor pivot, and a propeller, the housing being fixedly attached to the hull and pivotally mounted to the pivot, the pivot being fixedly attached to the motor and transmission assembly, the assembly being attached to the propeller.

At least one solar array may be aligned with the central axis of the hull, and may be gimballed about respective elevation and azimuth axes of the array. At least one solar array may provide electrical power to the propulsion system during daytime flight operations and the multiplicity of energy storage units may provide electrical power to the propulsion system during night time flight operations.

The autonomous control system of the present invention, the overall air management subsystem, and the propulsion system may provide navigational control between selected waypoints, wherein the autonomous control system may include a GPS receiver and a compass. Therefore, the overall air management subsystem, the autonomous control system, and the propulsion system may be adapted to control movement of the airship about its center of gravity.

The hull of the present invention may have an outer surface and a multiplicity of tail fins may be disposed in a first position contiguous with the outer surface of the hull during ascent to flight altitude and the multiplicity of tail fins may move to a second position non-contiguous with the surface of the hull as the hull inflates due to a reduction in atmospheric pressure.

The present invention may also include, as an alternative embodiment, a hull defining an enclosed cavity; a lifting gas and at least one solar array disposed within the cavity; a forward ballast reservoir; an aft ballast reservoir; a ballast management subsystem attached to the hull and in fluid communication with the forward and aft ballast reservoirs; an equipment bay attached to the hull, the bay having a multiplicity of energy storage units and an autonomous control system; a propulsion system attached to the hull and in electrical communication with at least one solar array and the energy storage units; and a multiplicity of tail fins attached to the hull. The ballast management subsystem may further comprise fluid lines between the forward and aft ballast reservoirs, a ballast valve, and a ballast exhaust.

The alternative embodiment airship propulsion system of the present invention may further comprise a gimbal housing, a motor and transmission assembly, a motor pivot, and a propeller, the housing being fixedly attached to the hull and pivotally mounted to a pivot, the pivot being fixedly attached to a motor and transmission assembly, the assembly being attached to the propeller.

In this alternative embodiment at least one solar array may be aligned with a central axis of the hull, and the array may be gimballed about respective elevation and azimuth axes of the array. At least one solar array may provide electrical power to the propulsion system during daytime flight operations and the multiplicity of energy storage units may provide electrical power to the propulsion system during night time flight operations.

The autonomous control system, the ballast management subsystem, and the propulsion system in this alternative embodiment of the present invention may provide navigational control between selected waypoints, wherein the autonomous control system may include a GPS receiver and a compass. Therefore, the ballast management subsystem, the autonomous control system, and the propulsion system may be adapted to control movement of the airship about its pitch and yaw axes.

The hull in the alternative embodiment of the present invention may have an outer surface and a multiplicity of tail fins may be disposed contiguous with the outer surface of the hull during ascent to flight altitude, wherein the multiplicity of tail fins may move to a second position non-contiguous with the surface of the hull as the hull inflates due to a reduction in atmospheric pressure.

DESCRIPTION OF THE PREFERRED EMBODIMENT

Figure 1:
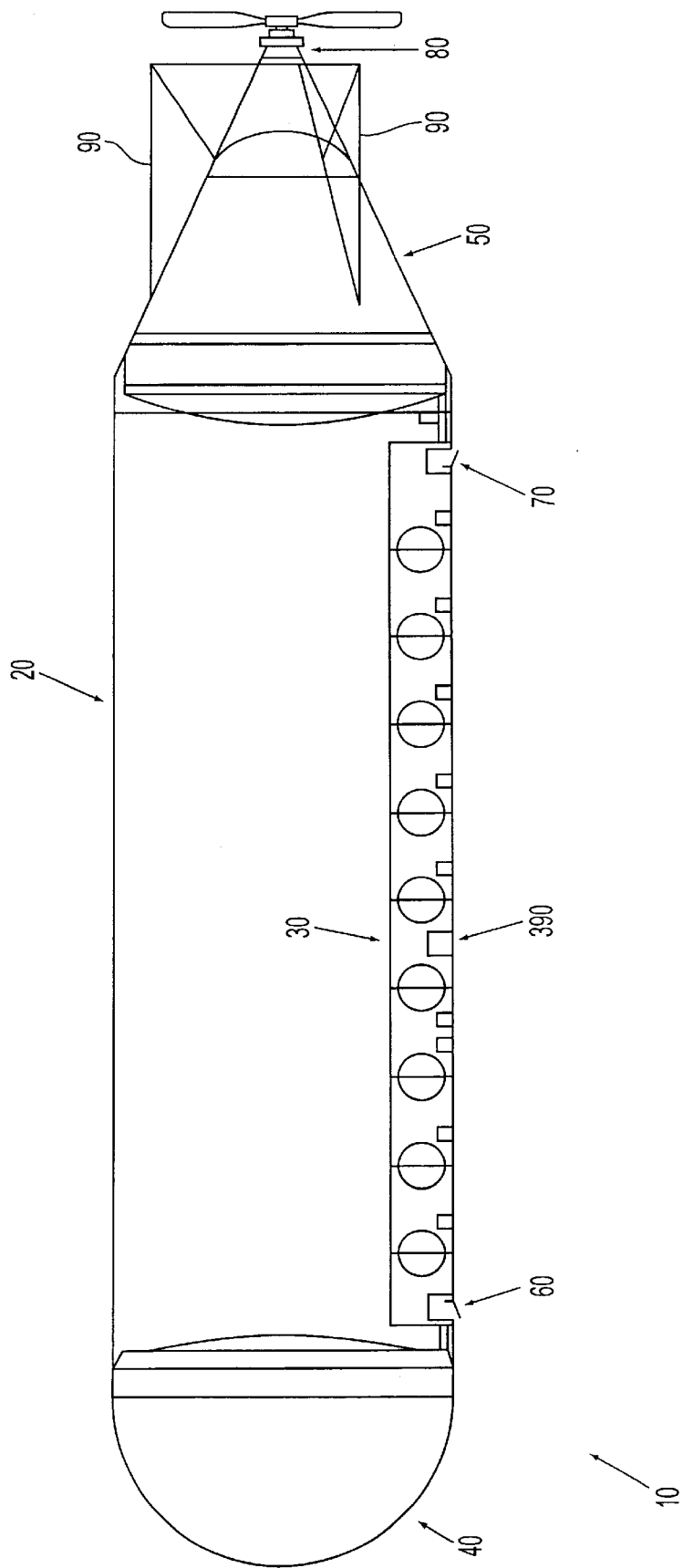
FIG. 1 is a side view of a first embodiment of the autonomous airship of the present invention.

Turning now to FIG. 1, a side view of the first embodiment of the autonomous stratospheric airship 10 can be seen. The hull 20 is made from a clear or relatively transparent polymer-based film, preferably 0.5 mm thick. The material is selected to withstand pressures resulting from changes in lifting gas temperatures contained within. The hull 20 is shaped as a stream-lined body with a hemispherical front and a conical rear, and the overall size is determined by the mass of the payload 390, while the length to width ratio is preferably 5:1. As the result of experimentation, it has been found that a design capable of carrying 18 pounds of useful load to 70,000 feet is approximately 125 feet long, and 25 feet in diameter.

Attached to the conical section of the hull 20 are a multiplicity of self-deployed tail fins 90, preferably three in number. The fins 90 are preferably made of the same film material as the hull 20. The fins 90 are supported by a self-erecting mechanism that deploys as the hull 20 body inflates during ascent. The hull 20 center of buoyancy is controlled by two internal ballonets, forward ballonet 40 and aft ballonet 50. Each ballonet can be used independently to control the location of the center of buoyancy, consequently effecting the airship's 10 movement about the pitch axis 745 (see FIG. 10). Alternatively, the ballonets 40 and 50 can be used together to cause the airship 10 to ascend or descend.

The airship 10 completely encloses an internal equipment bay 30 chamber which houses solar arrays 340, forward and aft air management sub-systems 60 and 70, a control system 390, and a mission-specific payload. While the hull 20 is filled with lifting gas comprising hydrogen, helium, or ammonia, the bay 30 is filled with air drawn from the atmosphere outside of hull 20 and is circulated within the bay 30 for cooling of internal components. The bay 30 can also be pressurized and so function as an additional buoyancy control mechanism for airship 10. To maintain the integrity of hull 20, the contents of bay 30 can be accessed from the exterior of airship 10 by means of a zipper, zip-lock plastic closure or other relatively air-tight closure (not shown).

Figure 2:
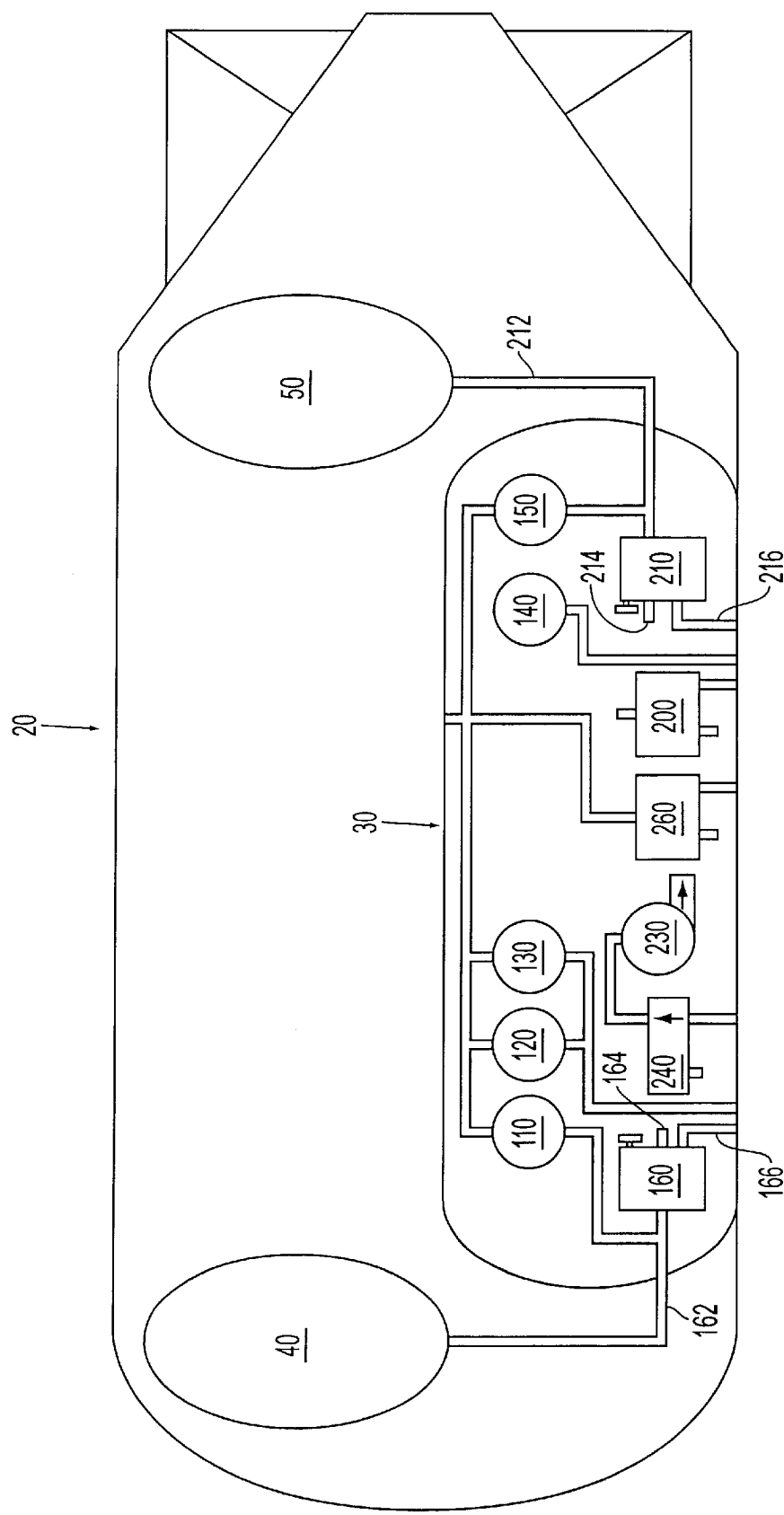
FIG. 2 is a schematic block diagram of the pressurization system for the ballonets within the first embodiment.

FIG. 2 depicts a schematic block diagram of the pressurization system used to control the air flow and pressurization of the equipment bay 30 and the forward and aft ballonets 40 and 50. Forward ballonet 40 is connected to forward ballonet valve 160 by way of forward ballonet fill-tube 162. Forward ballonet pressure sensor 110 is used to monitor the pressure differential between the forward ballonet 40 and the lifting gas pressure within hull 20. Forward ballonet valve 160 is also connected to the atmosphere within the equipment bay 30 by way of forward ballonet equipment bay intake 164. Forward ballonet 40 may exhaust air to the atmosphere external to the hull 20 by means of forward ballonet atmospheric exhaust 166. Thus, forward ballonet 40 may take in air from the atmosphere surrounding hull 20 by way of forward ballonet equipment bay intake 164, or exhaust air to the atmosphere surrounding hull 20 by way of forward ballonet atmospheric exhaust 166.

Similarly, rear ballonet 50 is connected to aft ballonet valve 210 by way of aft ballonet fill tube 212. The differential pressure between the aft ballonet 50 and the lifting gas within hull 20 is measured by aft ballonet pressure sensor 150. Aft ballonet 50 operates in a manner similar to forward ballonet 40; that is, aft ballonet 50 may take in air from the atmosphere surrounding hull 20 by way of aft ballonet equipment bay intake 214, and may exhaust air to the atmosphere surrounding hull 120 by way of aft ballonet atmospheric exhaust 216.

Figure 3:
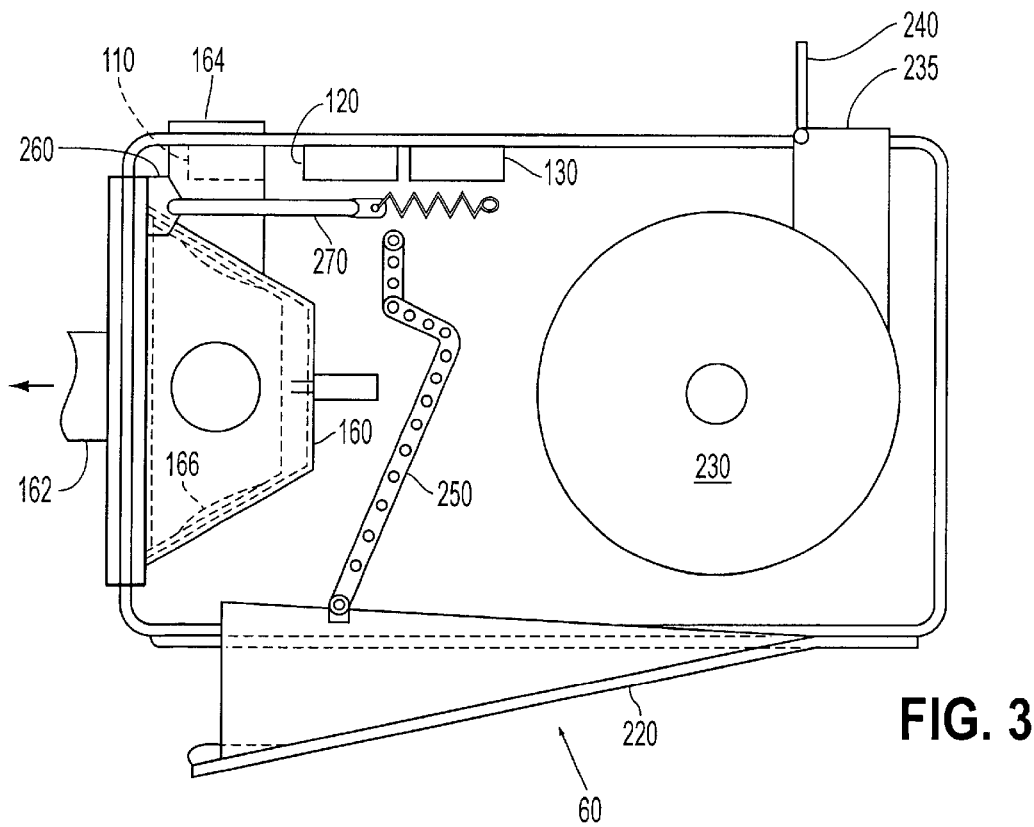
FIG. 3 is a side view of a forward ballonet air management subsystem.
Figure 4:
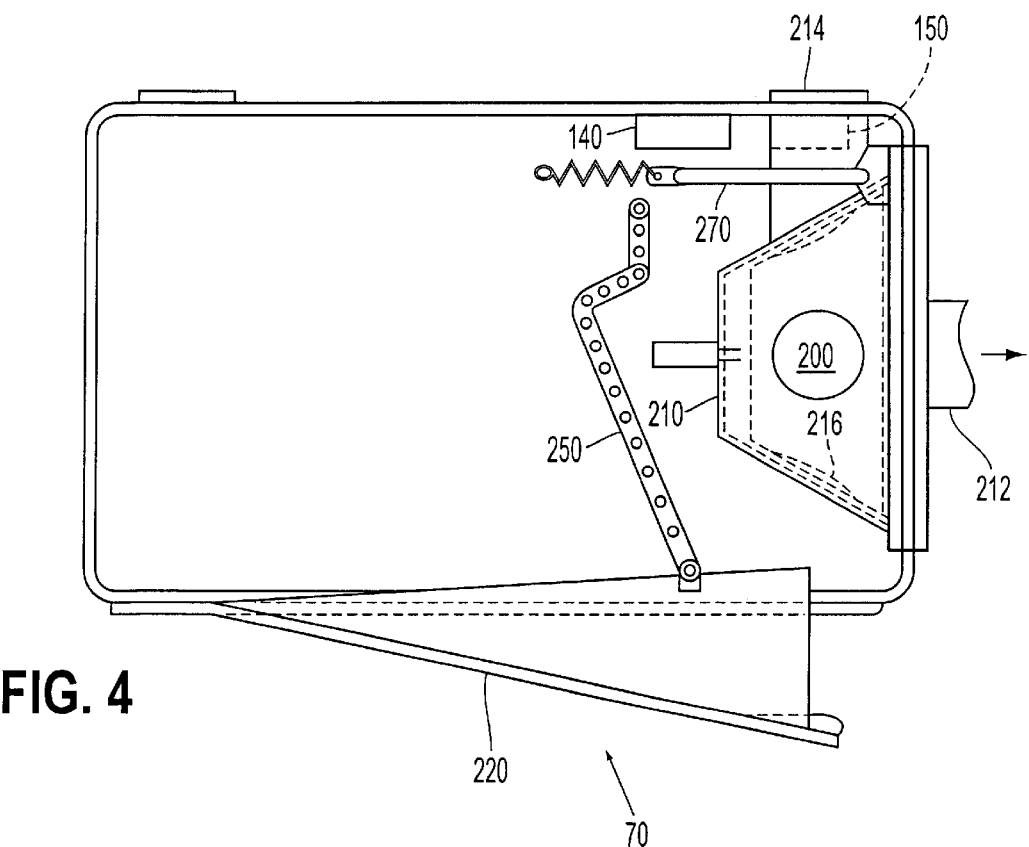
FIG. 4 is a side view of an aft ballonet air management subsystem.

The physical implementation of the airship 10 air management sub-system is illustrated in FIGS. 3 and 4. FIG. 3 depicts a side view of the forward air management subsystem 60, and FIG. 4 depicts a side view of the aft air management sub-system 70. Turning now to FIG. 3, it can be seen that the forward air management sub-system 60 provides a housing for the forward ballonet valve 160, forward ballonet pressure sensor 110, equipment bay pressure sensor 120, hull pressure sensor 130, and blower motor 230. Forward air management sub-system 60 also incorporates a scoop 220 to further assist in air flow control.

During normal operations, the blower motor 230 will take in air from the atmosphere surrounding hull 20 via scoop 220 and pressurize the equipment bay 30 by means of equipment bay atmospheric intake 235 and check valve 240, which prevents release of pressurized air from equipment bay 30 back into the atmosphere. The pressure within the hull 20 is monitored by hull pressure sensor 130. In order to pressurize the forward ballonet 40 so as to pitch the airship 10 downward or cause the airship 10 to descend (assuming a similar action by aft air management sub-system 70), the forward ballonet valve 160 is operated so as to direct pressurized air from the equipment bay 30, through forward ballonet equipment bay intake 164 to the forward ballonet 40 by way of forward ballonet fill tube 162. If it is desired to pitch the airship 10 upward or to ascend (assuming a similar action conducted with aft air management subsystem 70), the forward ballonet valve 160 can be operated so as to exhaust the forward ballonet 40 air by way of the forward ballonet fill tube 162 and the forward ballonet atmospheric exhaust 166 port into the atmosphere surrounding the hull 20 by way of scoop 220. The operation of scoop 220 is controlled by scoop actuator 250. If the pressure within the equipment bay 30 and forward ballonet 40 are as desired for a given flight attitude and altitude, then the forward ballonet valve 160 can be operated so as to close off the forward ballonet fill tube 162 and prevent the escape of any air from the forward ballonet 40. As a safety measure, hull pressure sensor 130 is used to monitor the lifting gas pressure exerted within hull 20 and can be used to activate a lifting gas relief valve 260 by way of a lifting gas release actuator 270 so as to dump lifting gas to the atmosphere and relieve any over-pressure situation within the hull 20.

Turning now to FIG. 4, it can be seem that aft air management sub-system 70 is identical to forward air management sub-system 60, with the exception of the sensors housed therein, the blower motor 230, and its associated check valve 240. Atmospheric pressure sensor 140 is housed in the aft air management sub-system 70 enclosure, along with the aft ballonet pressure sensor 150. Inflation and deflation of the aft ballonet 50 occurs in a similar fashion to that of forward ballonet 40, except that air for the aft ballonet 50 is taken directly from the equipment bay 30, and is supplied from the blower motor 230 located in the forward air management sub-system 60. That is, the aft ballonet 50 is inflated by operation of the aft ballonet valve 210 so as to create a path between the aft ballonet equipment bay intake 214 and the aft ballonet fill tube 212. The aft ballonet 50 is deflated by operating the aft ballonet valve 210 so as to create a path between the aft ballonet fill tube 212 and the aft ballonet atmospheric exhaust 216. The scoop 220 on the aft air management sub-system 70 can likewise be operated to assist in exhausting air from the aft ballonet 50.

The aft air management sub-system 70 also has the capability of depressurizing the hull 20 by activating a lifting gas relief valve 260 by means of lifting gas release valve actuator 270. By operating the aft ballonet valve 210 so as to create a path between the equipment bay intake 214 and the equipment bay outlet valve 200, it is also possible to exhaust air from the equipment bay 30 into the atmosphere surrounding the hull 20.

Figure 5:
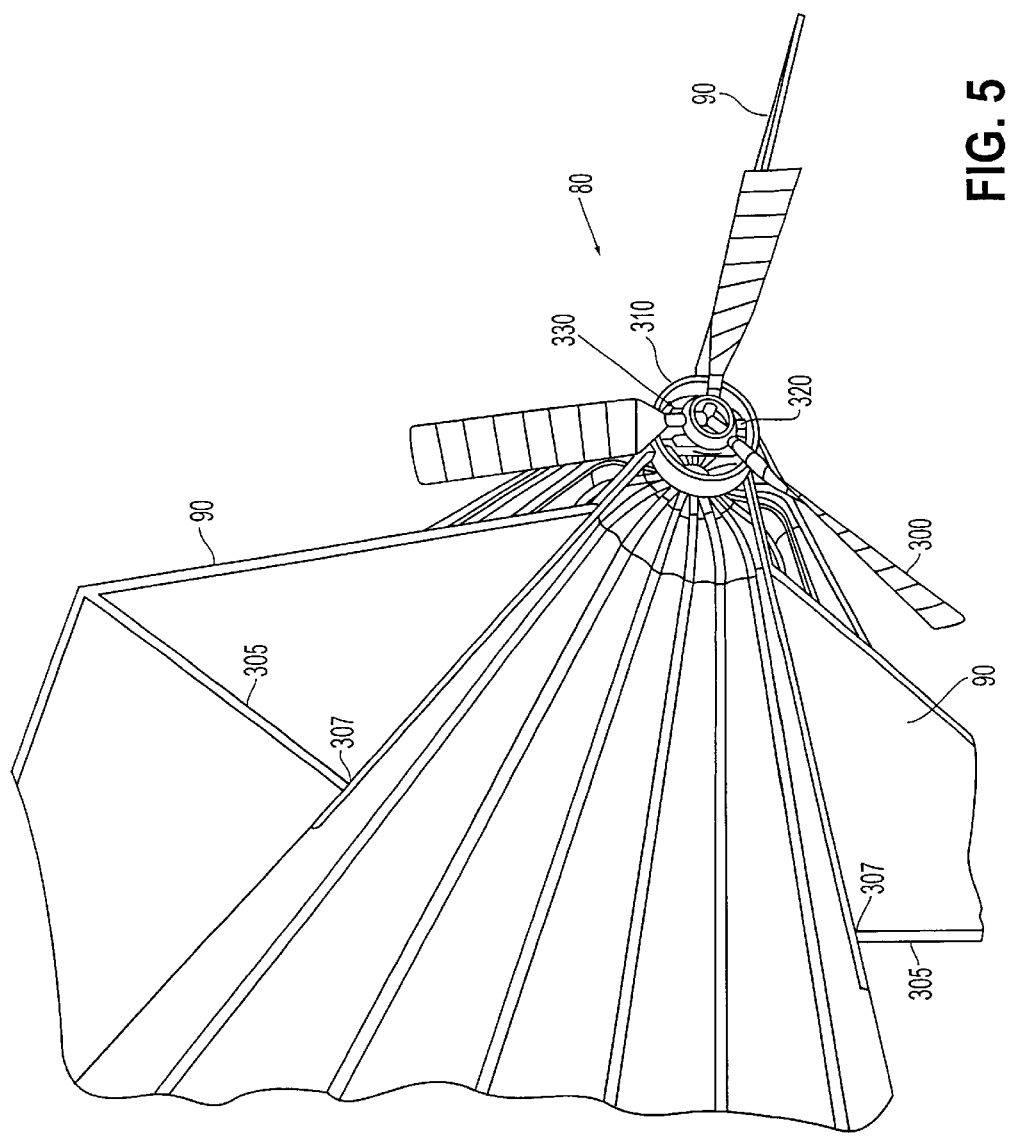
FIG. 5 is a perspective view of the propulsion system for an airship.

The airship 10 is propelled by a propulsion system 80 comprising a propeller 300, driven by a motor and transmission assembly 330, as shown in FIG. 5. Left and right directional control of the airship 10 is provided by moving the motor and transmission assembly 330 about the axis of the motor pivot 320, which is mounted within the gimbal housing 310. The propeller 300 is preferably a three-bladed fixed-pitch type, but a variable-pitch type propeller 300 may be used without detracting from the spirit of the invention. Those skilled in the art will readily recognize the advantages and disadvantages involved in choosing between these two types of propellers.

Figure 10:
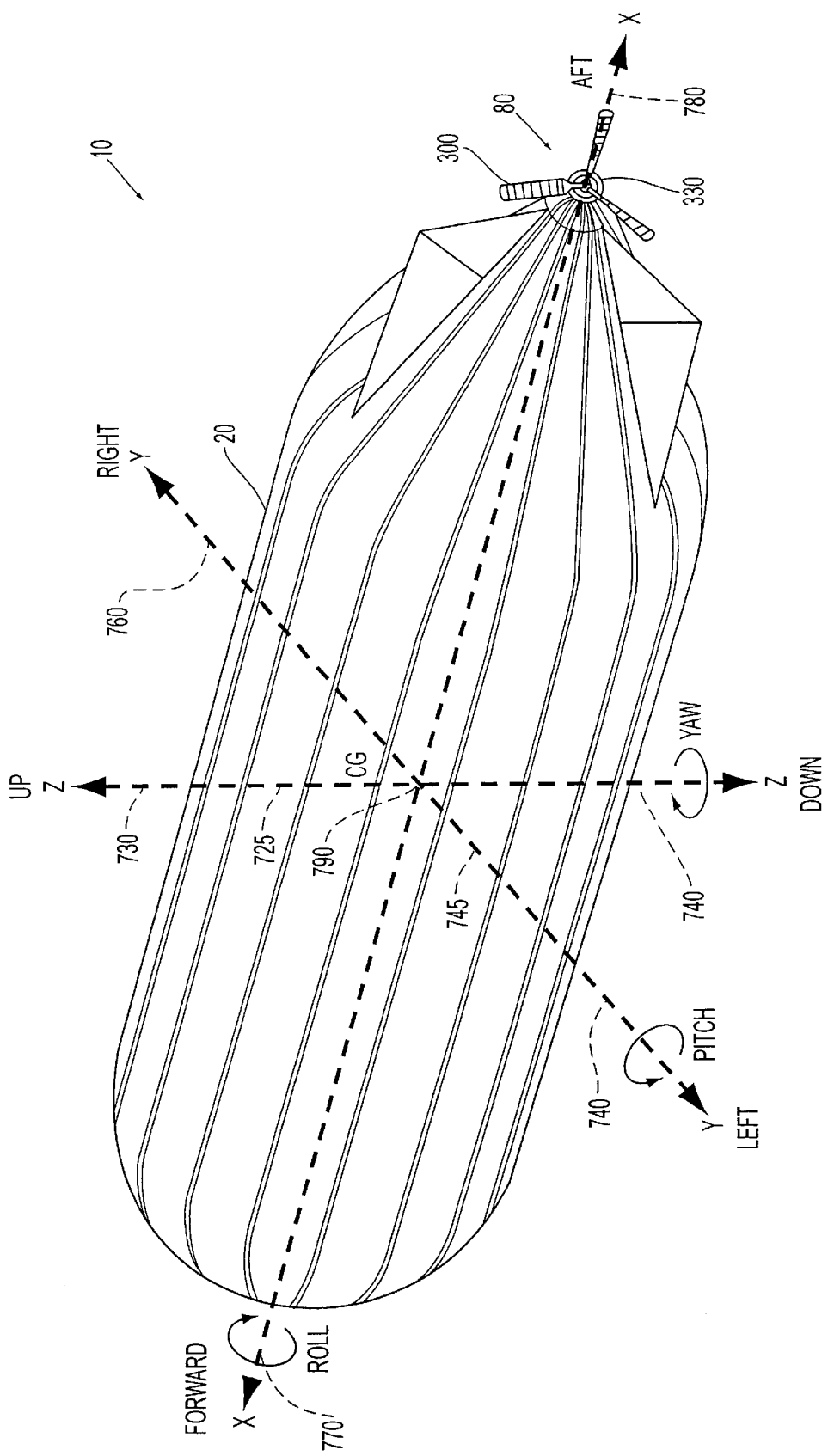
FIG. 10 is a perspective view of an airship illustrating various movement axes.

FIG. 5 also illustrates the tail fins 90 of the airship 10, which are used to enhance in-flight stability about the pitch axis 745, yaw axis 725, and the hull central axis (or roll axis) 420 of the airship 10 (see FIG. 10). Tail fins 90 are most preferably three in number, and each comprise a pivoting mast 305 connected to a fin pivot 307. This manner of construction allows each of the tail fins 90 to lay along the surface of the hull 20 of the airship 10 during initial launch and, as the hull 20 begins to expand due to the decrease in atmospheric pressure surrounding it, the tail fins 90 will deploy into their extended position away from hull 20 (as illustrated in FIG. 5) due to the rotation of the mast 305.

Figure 6:
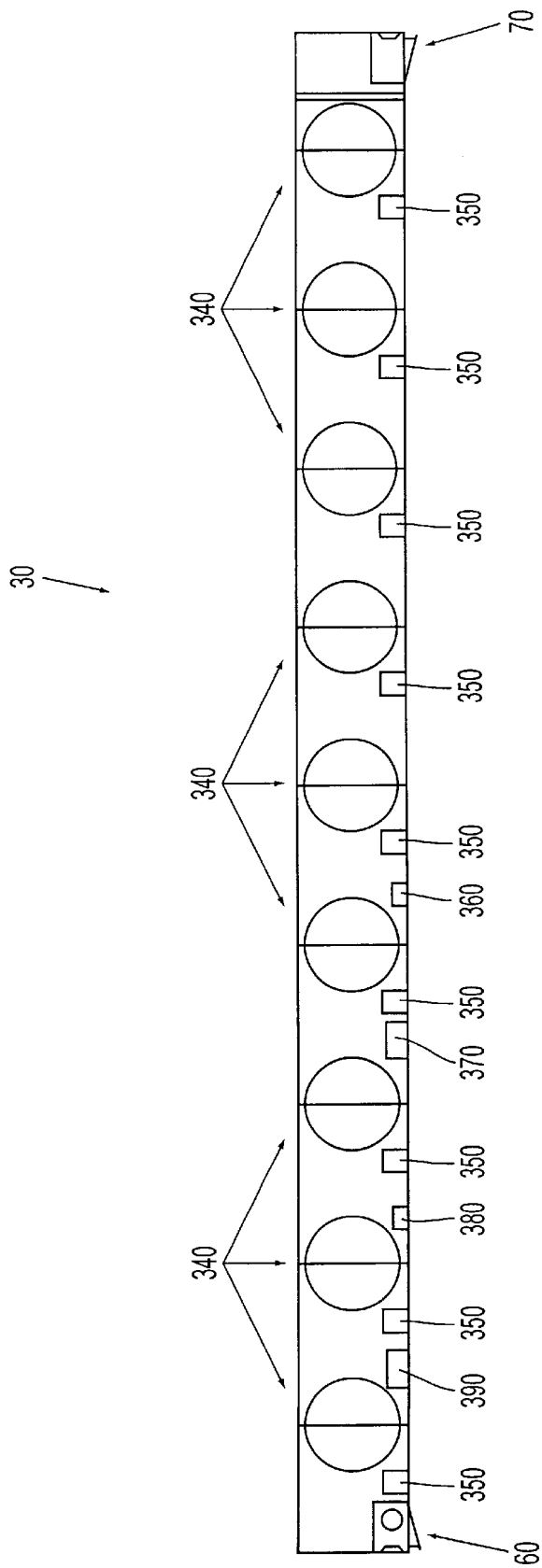
FIG. 6 is a side view of the equipment bay assembly for the first embodiment.

FIG. 6 illustrates the equipment bay 30 and its contents comprising internally-gimballed solar arrays 340, energy storage units 350, emergency system 360, autonomous control system 390, communications system 380, and the emission-specific payload 370. As mentioned previously, the forward and aft air management sub-systems 60 and 70 can be used to pressurize and exhaust the equipment bay 30. In addition, the constant induction of air by way of forward air management sub-system 60 into equipment bay 30 can be used to cool the contents of equipment bay 30, especially solar arrays 340. Pressurizing the equipment bay 30 with air from the atmosphere surrounding hull 20 also serves as an additional buoyancy control mechanism for the airship 10.

All of the energy used to power the propulsion system 80 is provided by the solar arrays 340. During the day, solar energy can be directly applied to the propulsion system 80, while night time energy is supplied by energy storage units 350, preferably deep-cycle batteries well known in the art, which are charged by the solar arrays 340 during the day.

Figure 7:
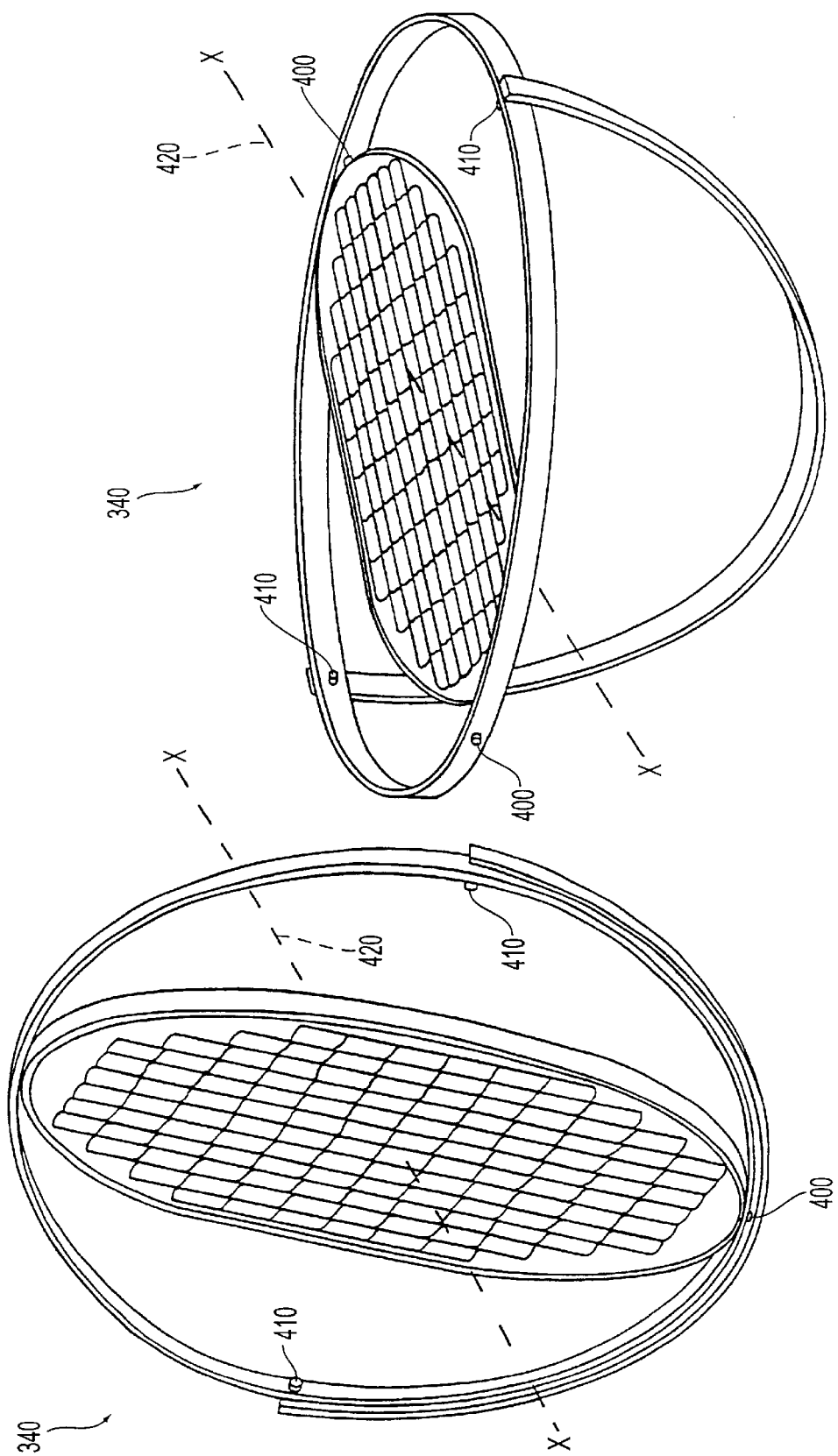
FIGS. 7A and 7B are perspective views of one of the internally-mounted solar array panels which provide electric power to the first embodiment.

The solar energy collection system consists of a multiplicity of arrays 340 that are installed within the equipment bay 30, which is located within the hull 20. As shown in FIGS. 7a and 7b, the arrays 340 are mounted on gimbals, denoted as azimuth rotation pivot 400 and elevation rotation pivot 410. These two axes of rotation, combined with the orientation of the arrays 340 along the hull central axis 420, allow pointing the solar array 340 panels to obtain maximum collection efficiency, regardless of the position of the airship 10 with respect to the sun. Internally mounting arrays 340 permit operation of the airship 10 without the associated aerodynamic drag of externally mounted solar panels. In addition, the construction of the airship 10 makes it possible to duct cooling air around the arrays 340 and other contents of the equipment bay 30 without breaching the integrity of the main hull 20, which also serves as the main lifting gas chamber. The equipment bay 30 is equipped with any of several closures well known in the art, such as zippers or plastic zip-lock devices (not shown) which provide direct access through the equipment bay 30 for installation servicing of the equipment at any time prior to launch, without affecting the integrity of the hull 20. The transparency or translucency of the hull 20 can be varied to affect the amount of solar energy collected by the arrays 340.

Figure 8:
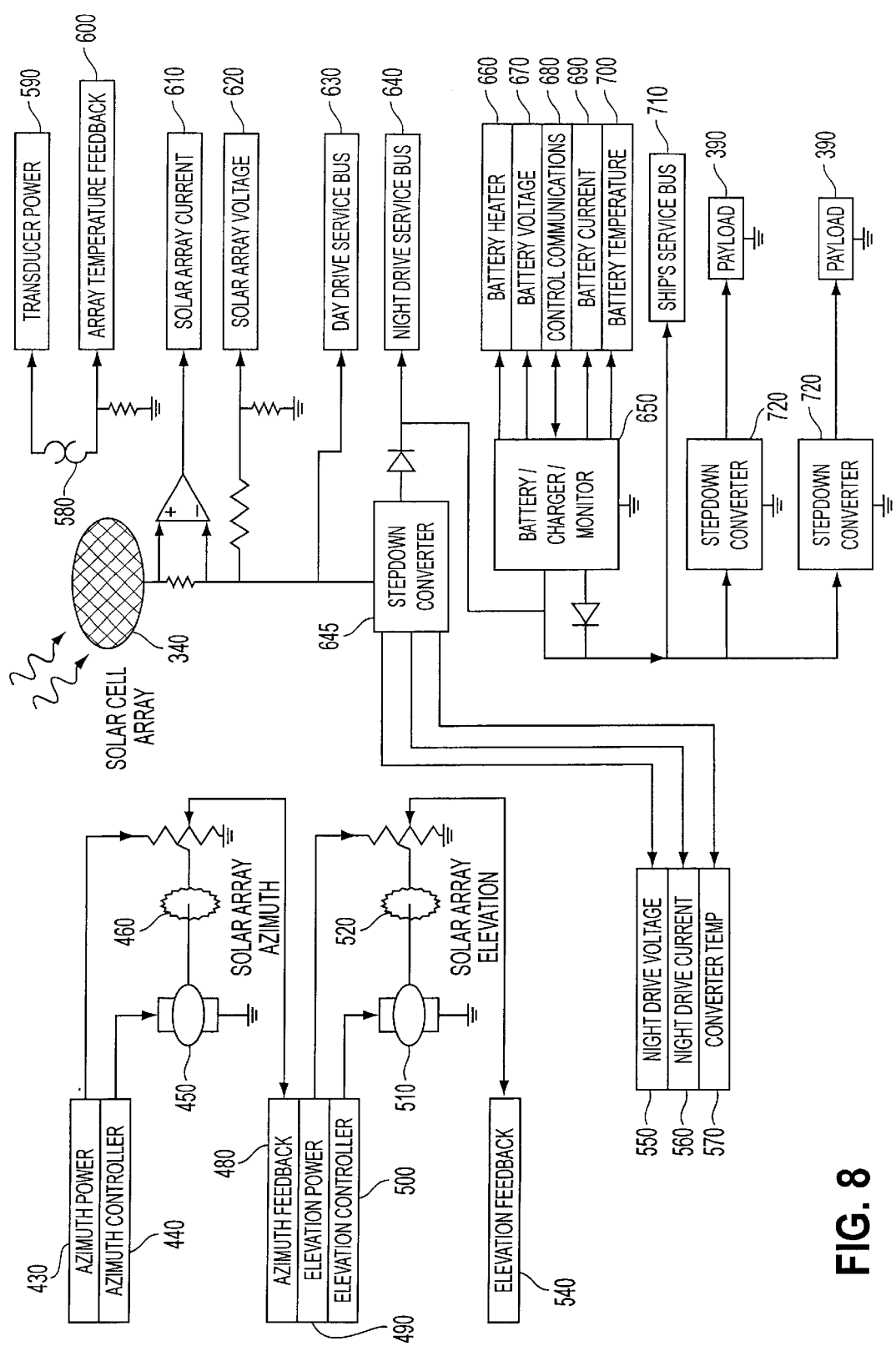
FIG. 8 is a schematic block diagram of the power supply system for the first embodiment.

Turning now to FIG. 8, the components for the energy provision and storage system for the airship 10 can be seen. Each solar array 340 is moved about its azimuth rotation pivot 400 by means of an azimuth motor 450, which is directed by an azimuth controller 440, and powered by an azimuth power source 430, derived from energy storage units 350 distributed throughout the equipment bay 30. Similarly, the arrays 340 are moved about their elevation rotation pivots 410 by an elevation motor 510, which is directed by an elevation controller 500 and powered by an elevation power source 490, also derived from energy storage units 350.

The activity of azimuth controller 440 is effected by the azimuth measurements derived from the azimuth feedback signal 480, provided by the azimuth transducer 460. Similarly, the activity of elevation controller 500 is influenced by the elevation feedback signal 540 provided by the elevation transducer 520. Both the azimuth and elevation controllers 440 and 500 are programmed to operate by way of proportional, integral, or derivative control, or some combination of these methods, as is well known in the art. Other feedback-based control systems are also anticipated by the present invention.

During the day, solar arrays 340 are connected so as to provide a relatively high motor drive voltage to the day drive service bus 630, preferably about 136 volts DC. The solar array current 610 and solar array voltage 620 are monitored by the autonomous control system 390 (not shown). Step down converter 645 operates to supply a battery charger/monitor 650 with sufficient current to charge the energy storage units 350 during daytime operations. Energy storage units 350, which may consist of lithium-ion batteries, or other sources of storage well known in the art, are monitored with respect to several parameters, including battery voltage 670, battery current 690, and battery temperature 700. If necessary, battery heaters 660 can be activated to bring the energy storage units up to a predetermined charging or operational temperature for a maximum efficiency. The monitored parameters are communicated to the autonomous control system 390 and communications system 380 by way of a control communication interface 680.

During nighttime operations, the propulsion system 80 is powered by way of night drive service bus 640. The night drive voltage 550, night drive current 560 and converter temperature 570 are also monitored. The resulting data is also communicated to the autonomous control system 390 and communication system 380.

The voltage derived from the step-down converter 645 and used to energize the night drive service bus 640 and the battery charger/monitor 650, can be further reduced by way of step-down converters 720, and used to power various payload 370 requirements. A standard avionics power bus, namely, ship service bus 710, provides a standardized DC voltage to the contents of the equipment bay 30. The ship service bus 710 is preferably operated at a voltage of 28 volts DC.

An array temperature transducer 600, powered by a transducer power module 590 is used to determined the temperature of the solar arrays by way of an array temperature transducer 580. If the arrays 340 exceed some predetermined temperature, then the forward and aft air management sub-systems 60 and 70 can be activated to cool the arrays 340 to a desired temperature. The array temperature monitoring activity, as well as the cooling activity are directed by the autonomous control system 390.

Figure 9:
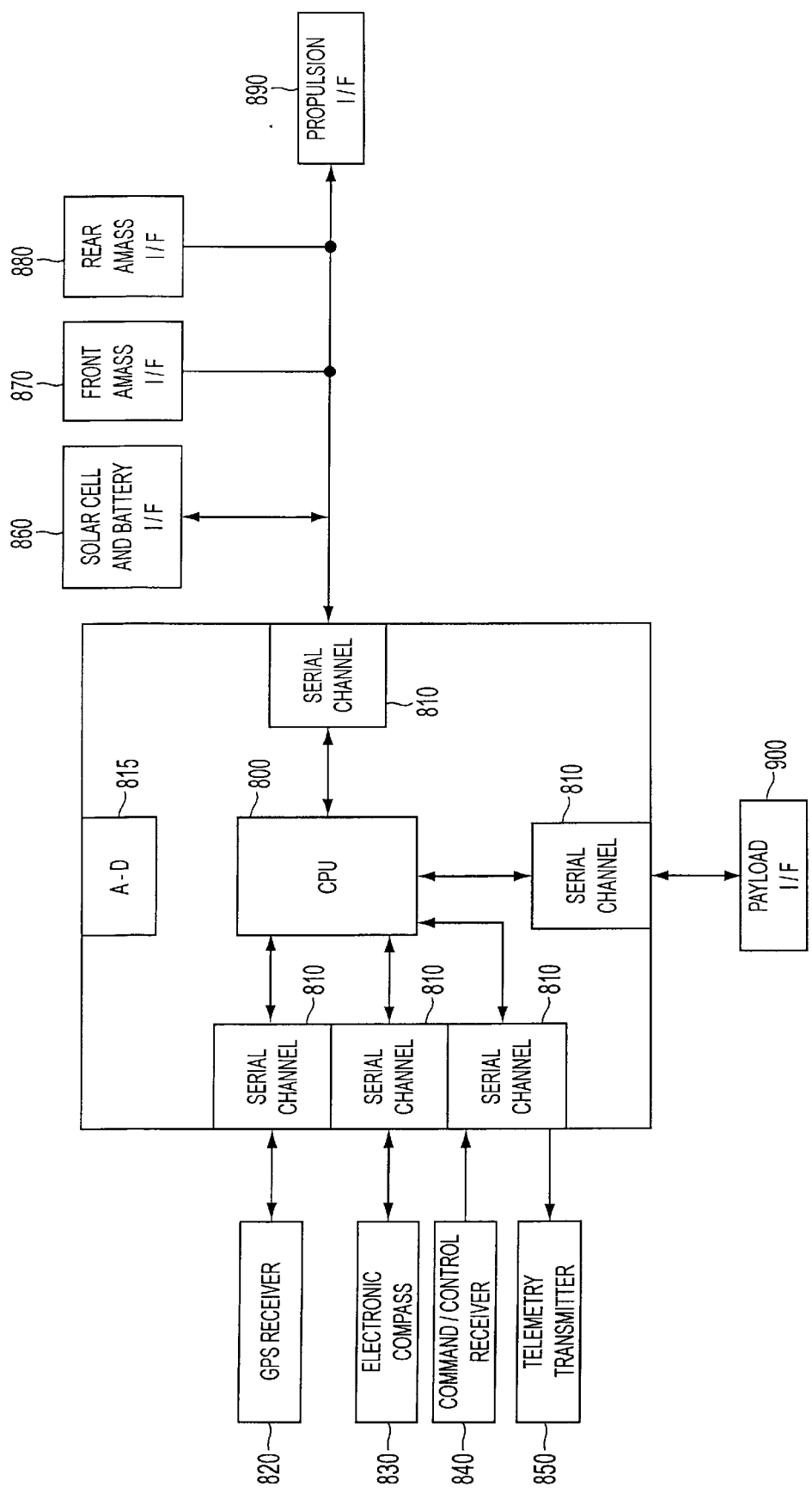
FIG. 9 is a block diagram of the controller interface circuitry for directing autonomous airship operations.

FIG. 9 illustrates a block diagram of the autonomous control system 390. While preferably implemented with a central processor 800 which communicates via a multiplicity of serial channels 810 and an analog-to-digital converter 815. However, specialized and more complex interfaces, such as may be utilized by the airship 10 energy storage system, the front and rear air management sub-systems 60 and 70, and the propulsion system 80, may be specially constructed and implemented as a solar cell and battery interface 860, a front air management sub-system interface 870, a rear air management sub-system interface 880, and a propulsion interface 890. Payload interface 900 will normally be specially constructed to interface to whatever mission-specific payload 370 is carried by the airship 10. A Global Positioning System satellite (GPS) receiver 820, electronic compass 830, command/control receiver 840, and telemetry transmitter 850 are also employed by the airship 10 to complete the autonomous control function. Included within the capabilities of airship 10 is the transmission of acquired data from the various transducers and sensors on board airship 10, and the payload 370. Command/control receiver 840 enables the reception of operational and emergency instructions from the ground control station (not shown) which monitors the progress of the airship 10 on any specific mission. The GPS receiver 820 enables exact positional monitoring and control of the airship 10, while the electronic compass 830 provides for dead-reckoning capability during periods where the GPS receiver 820 is incapable of proper function. The autonomous control system 390, combined with the operation of the air management sub-systems 60 and 70, and the propulsion system 80, provide an airship 10 capable of autonomous operation between pre-selected or commanded waypoints. The internally-gimballed solar arrays 340 can be pointed for maximum collection efficiency based on geographical location, date, and time. Command control and data reception can also be interactively applied to the payload 390.

The autonomous control system can be programmed to select different speeds for day and night operations to maintain the average location of the airship 10 over a specified point on the surface of the earth. Properly selected, the speed schedule selected for airship 10 will optimize use of the solar arrays 340 and the energy storage units 350 to maximize the average speed of the airship 10. When the prevailing winds are less than the maximum airship 10 design speed, excess power is available to reposition the airship 10 with respect to the pitch axis 745, yaw axis 725, and the hull central axis 420, as illustrated in FIG. 10.

The propulsion system 80 propels the airship 10 with forward movement 770 as long as the electric power available to the motor and transmission assembly 330 is great enough to overcome the prevailing winds, less power (or no power) can also be applied to the motor and transmission 330 so that airship 10 in fact travels with aft movement 780. By moving the motor and transmission assembly 330 about the axis of motor pivot 320, the line of propulsion for the propeller 300 can be moved so as to effect left movement 750 or right movement 760 of the airship 10. As mentioned previously, the forward and aft ballonets 40 and 50 can also be pressurized independently so as to cause downward movement 740 (if both are pressurized), or upward movement 730 (if both are deflated). The sophisticated combination of autonomous control system 390, combined with the actions of the forward and aft air management sub-system 60 and 70, and the motor pivot 320 of the propulsion system 80, provide an airship 10 which is completely controllable about the airship's center of gravity 790.

The autonomous stratospheric airship 10 can be used for many different applications, including provision of a vehicle platform for: large terrestrial viewing areas with a long flight duration (e.g. exoatmospheric research); communication relay operations (e.g. radio frequency transponder for voice, data, video etc.; store and forward RF data; signal interception; or direct broadcast); a terrestrial surveillance platform with camera and sensors; surveillance of the atmosphere or space; and a platform for scientific and atmospheric research.

The autonomous stratospheric airship 10 is designed to be a neutrally buoyant structure designed specifically for operations in the lower stratosphere (i.e. 60,000–100,000 feet) it does not require aerodynamic lift, and the hull 20 can be filled with any gas that is lighter than air, including hydrogen, helium, or ammonia. Use of a thin polymeric hull material allows inexpensive and light-weight construction of a hull 20 which is able to contain the lifting gas pressure while isolating the equipment bay 30 from the surrounding atmosphere. The airship 10 can be launched and climbs to altitude much in the same way as a scientific superpressure balloon, and no control or propulsion is required to effect such a launch. The solar regenerative electric energy collection and storage system provides propulsion during the day and night, and continuous operation of powered payloads 370. Internally-gimballed solar arrays 340 can be positioned for optimal collection efficiency while having no effect on the aerodynamic profile of the airship 10.

Figure 11:
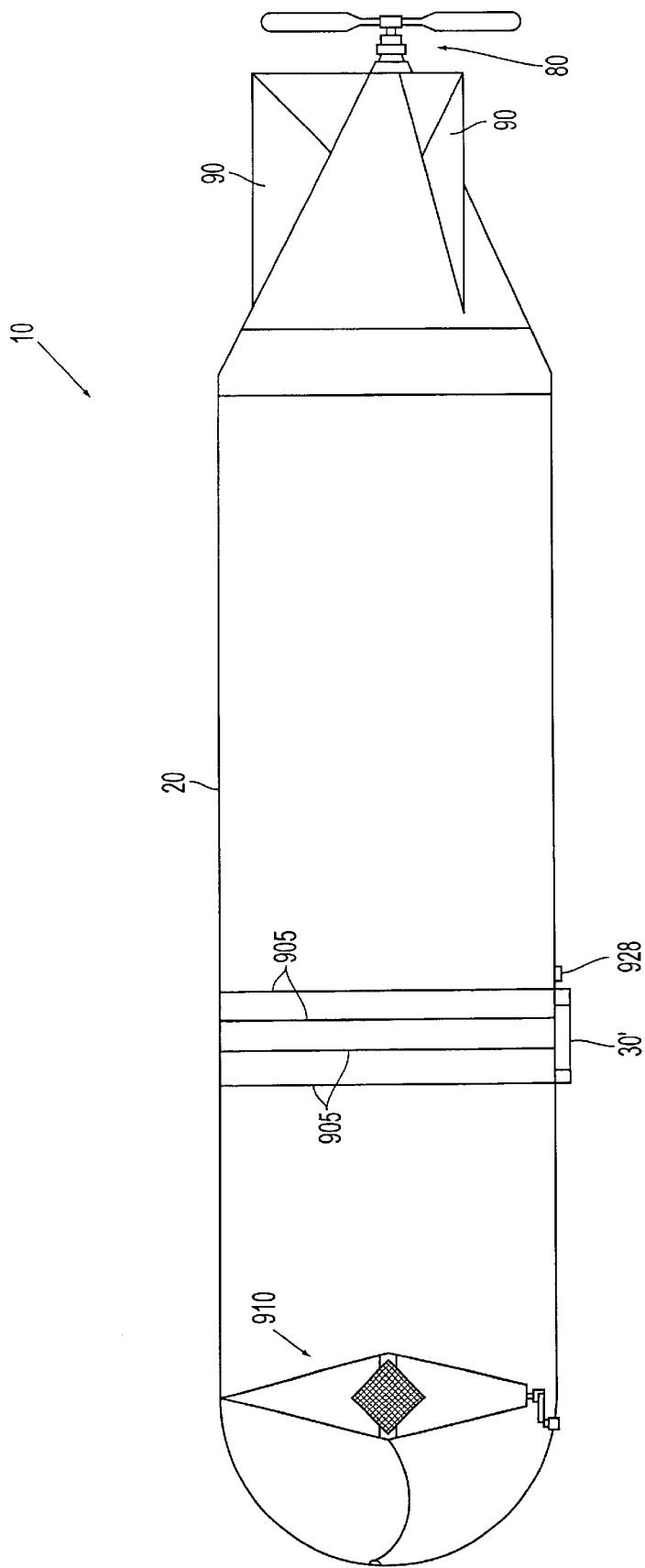
FIG. 11 is a side view of a second, alternative embodiment of the autonomous airship of the present invention.

As a way of significantly reducing the cost of providing an autonomous stratospheric airship 10, an alternative embodiment, as shown in FIG. 11, is provided by the instant invention. While the size and materials for construction of the hull 20 are identical to the embodiment pictured in FIG. 1, in this case, the equipment bay 30' is located on the exterior of the hull 20, and suspended from the interior of the hull 20 by payload suspension lines 905. While a single rectangular array assembly 910 is maintained within the hull 20 for providing operative energy to the airship 10 during the day, the forward and aft ballonets 40 and 50, along with the forward and aft air management subsystems 70 are no longer used. However, the propulsion system 80, along with the self-erecting tail fins 90, are retained.

Figure 12:
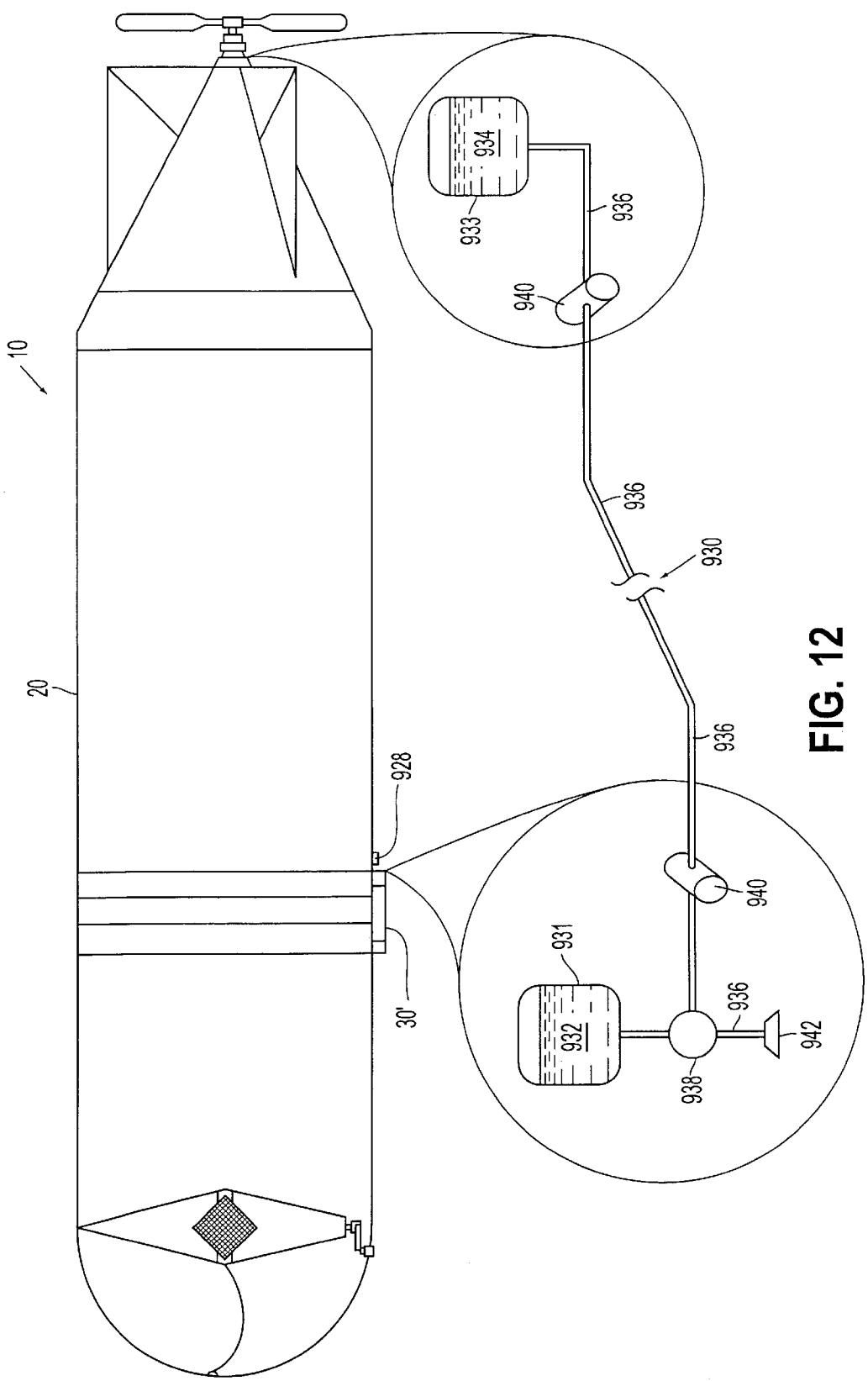
FIG. 12 is a schematic view of the ballast management subsystem for a second, alternative embodiment of the autonomous airship of the present invention.

Turning now to FIG. 12, the fluid ballast system 930 can be seen. This simplified ballast system, while not providing the capability of the previous embodiment with respect to altitude control, still enables adjusting the attitude about the pitch axis 745, as well as in the upward movement 730 direction.

The fluid ballast system 930 comprises a forward ballast reservoir 931, filled with forward fluid ballast 932, connected by way of fluid lines 936 to aft ballast reservoir 933, filled with aft fluid ballast 934. Forward and aft fluid ballasts 932 and 934 are moved back and forth by way of by-directional pumps 940 and fluid lines 936, whenever ballast valve 938 is open so as to provide fluid communication between forward ballast reservoir 931 and aft ballast reservoir 933. To move airship 10 in the upward movement 730 direction, the ballast valve of 938 can be opened so as to provide fluid communication between forward ballast reservoir 931 and ballast exhaust 942, or aft ballast reservoir 933 and ballast exhaust 942. While a limited amount of directional control is possible in a downward movement 740 direction, it can only be achieved at the expense of draining helium from the hull 20 by way of a helium release valve 928. Extra helium may be carried in a canister in the equipment bay 30, but such operation is not usually practical, due to payload weight limitations.

Figure 13:
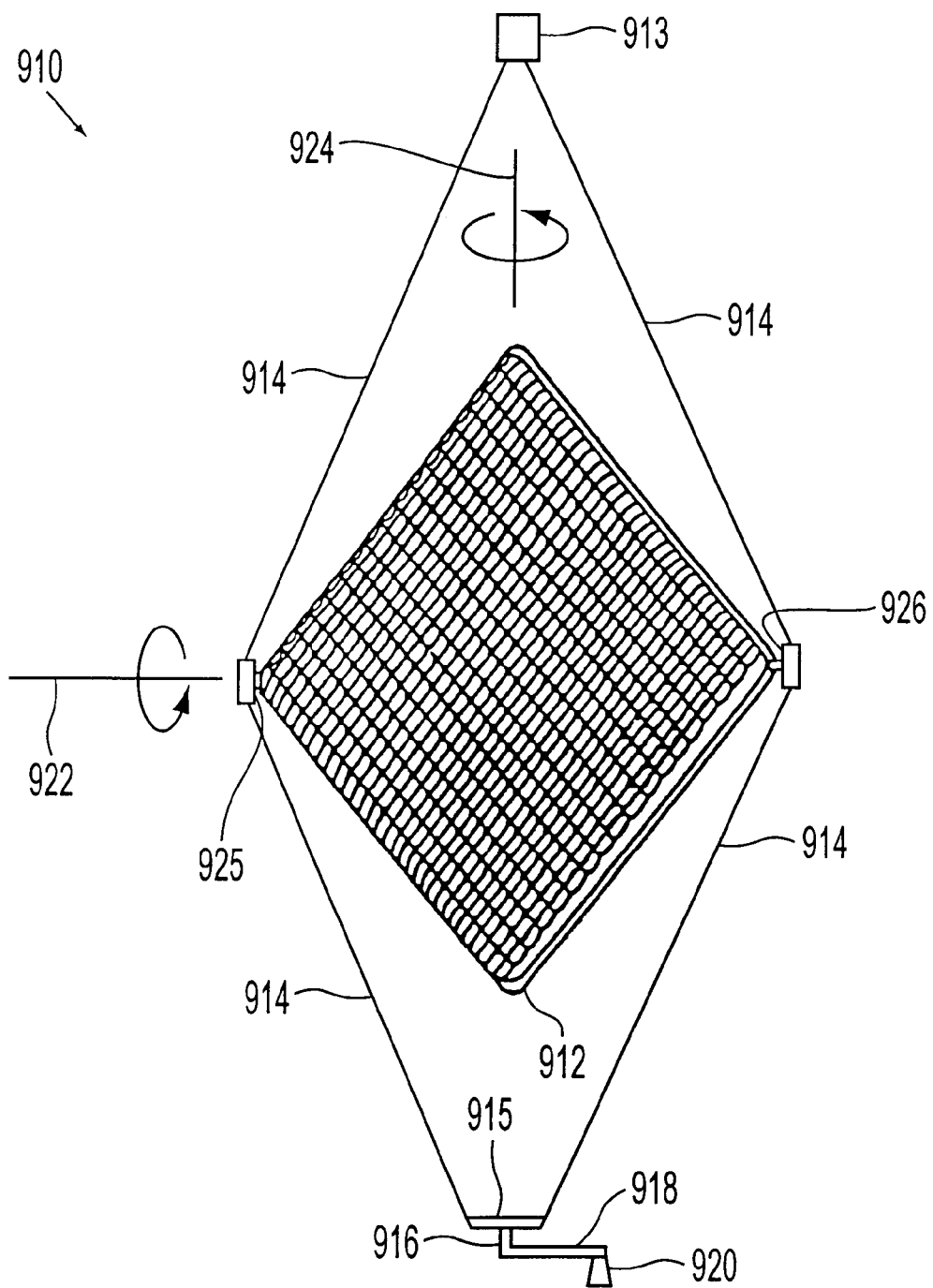
FIG. 13 is a perspective view of the rectangular solar array assembly for a second, alternative embodiment of the autonomous airship of the present invention.

FIG. 13 details the rectangular array assembly 910, which comprises a rectangular solar array suspended between a Z-axis swivel 913 and a Z-axis drive arm 915 by means of array suspension lines 914. The rectangular solar array 912 is held at two corners between the Y-axis drive 925 and the Y-axis bearing 926, so as to pivot about the elevation rotation axis 922. Similarly, the rectangular solar array 912 can be made to pivot about the azimuth rotation axis 924 by driving the Z-axis drive arm 915 with the Z-axis drive 916. Vertical movement of the rectangular solar array 912, due to flexing of the hull 20, is accommodated by the link arm 918, which allows the Z-axis drive 916 and the feedthrough and mount 920 to move freely. By providing for movement in both the elevation rotation axis 920 and the azimuth rotation axis 924, the rectangular solar array 912 can be positioned in whatever location is most effective for receiving the maximum amount of solar energy for conversion into electricity. The suspension system shown allows construction of the rectangular array assembly 910 to be lighter and less expensive than that used for the solar arrays 340 illustrated in FIGS. 7A and 7B. In fact, the rectangular solar array 912 can even be applied to an inflatable structure, which becomes rigid at flight altitude, and is flexible on the ground.

Figure 14:
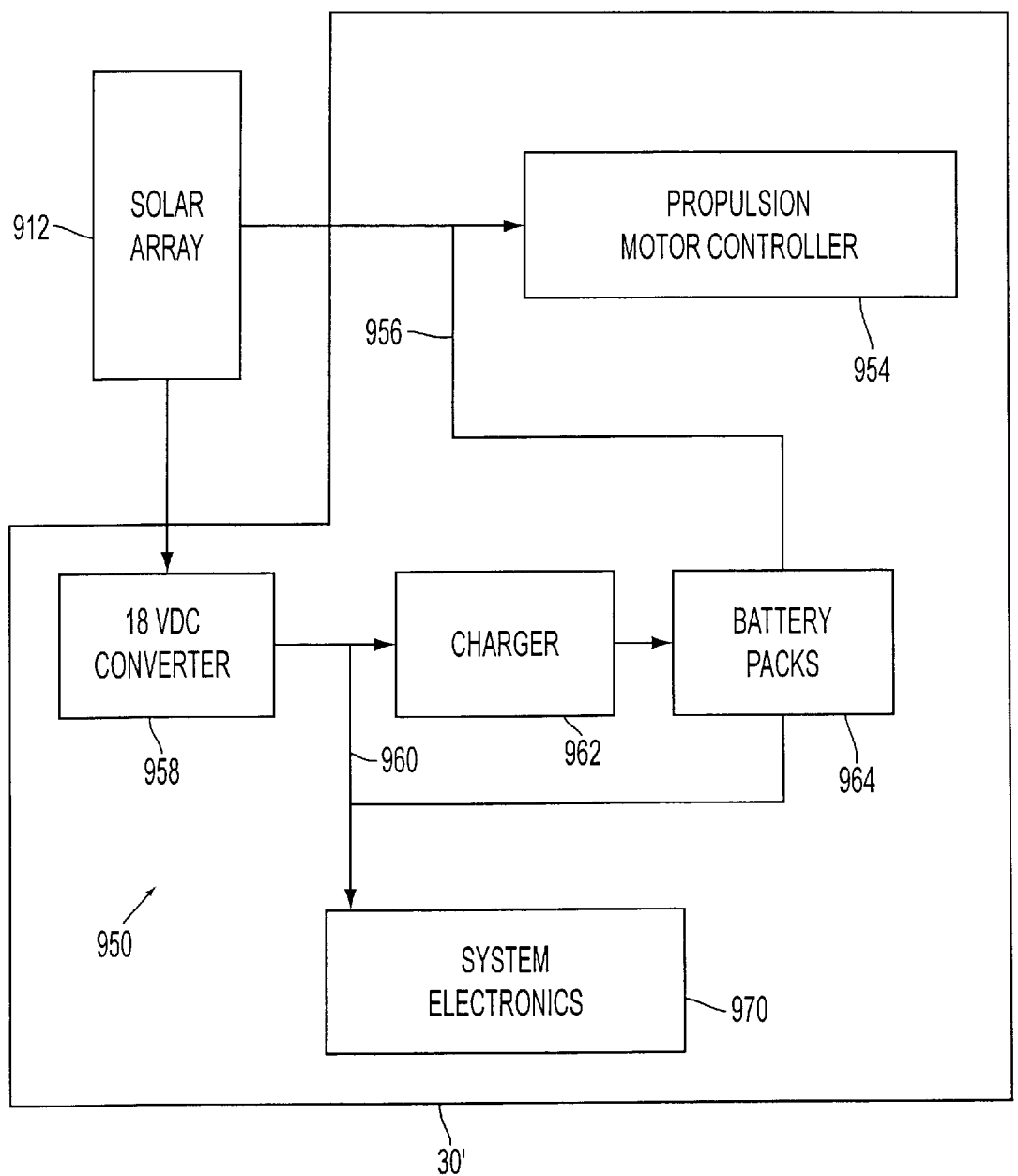
FIG. 14 is a schematic block diagram of the power supply subsystem for a second, alternative embodiment of autonomous airship of the present invention.

FIG. 14 illustrates the power distribution subsystem 950 contained in the external equipment bay 30' utilized by the alternative embodiment of the airship 10. In this case, the rectangular solar array 912 provides power to the motor controller 954 by way of a high voltage bus 956. An alternative source of power on this bus 956 are battery packs 964. The rectangular solar array 912 also provides power to an 18 VDC converter 958, which in turn energizes a charger 962 for the battery packs 964, and provides power to the system electronics 970 by way of a low-voltage bus 960. The system electronics 970 in this case can be similar to or identical to the arrangement disclosed in FIG. 9, less the front and rear air management subsystem interfaces 870 and 880. Instead, a single interface to the fluid ballast system 930 must be implemented to control the bidirectional pumps 940 and the ballast valve 938.

Although the invention has been described with reference to specific embodiments, this description is not meant to be constructed in a limited sense. Various modifications of the disclosed embodiments, as well as alternative embodiments of the invention will become apparent to persons skilled in the art upon reference to the disclosure herein. It is, therefore, contemplated that the appended claims will cover such modifications that fall within the scope of the invention.

We claim:
1. An autonomous stratospheric airship comprising:
   a hull defining an enclosed cavity:
   a lifting gas and at least one solar array disposed within said hull defined enclosed cavity to be movable independently of the orientation of the hull;
   a forward ballast reservoir;
   an aft ballast reservoir
   a ballast management subsystem attached to said hull and in fluid communication with said forward and aft ballast reservoirs;
   an equipment bay attached to said hull, said equipment bay having a multiplicity of energy storage units and an autonomous control system;
   a propulsion system attached to said hull and in electrical communication with said at least one solar array and said energy storage units; and
   a multiplicity of tail fins, said multiplicity of tail fins being attached to said hull.

2. The airship of claim 1 wherein said ballast management subsystem further includes:
   fluid lines between said forward and aft ballast reservoirs;
   a ballast valve; and
   a ballast exhaust.

3. The airship of claim 1 wherein said propulsion system further includes:
   a gimbal housing;
   a motor and transmission assembly;
   a motor pivot; and
   a propeller;
   said gimbal housing being fixedly attached to said hull and pivotably mounted to said motor pivot;
   said motor pivot being fixedly attached to said motor and transmission assembly;
   said motor and transmission assembly being attached to a propeller.

4. The airship of claim 1 wherein said at least one solar array within said hull defined enclosed cavity is aligned with a central axis of said hull, and said at least one solar array is gimballed about respective elevation and azimuth axes of said at least one solar array.

5. The airship of claim 1 wherein said at least one solar array within said hull defined enclosed cavity provides electrical power to said propulsion system during daytime flight operations and said multiplicity of energy storage units provide electrical power to said propulsion system during night time flight operations.

6. The airship of claim 1 wherein said autonomous control system, said ballast management system, and said propulsion system provide navigational control between selected waypoints.

7. The airship of claim 1 wherein said autonomous control system includes a GPS receiver.

8. The airship of claim 1 wherein said autonomous control system includes a compass.

9. The airship of claim 1 wherein said ballast management subsystem, said autonomous control system, and said propulsion system are adapted to control movement of the airship about its pitch and yaw axes.

10. The airship of claim 1 wherein said hull has an outer surface and said multiplicity of tail fins are disposed contiguous with said outer surface of said hull during ascent to flight altitude and wherein said multiplicity of tail fins move to a second position non-contiguous with said outer surface of said hull as said hull inflates due to a reduction in atmospheric pressure.

* * * * *